(12) United States Patent
Syvenkyy

(10) Patent No.: US 11,112,356 B2
(45) Date of Patent: Sep. 7, 2021

(54) OPTICAL REFLECTIVE EDGE OR CONTRAST SENSOR

(71) Applicant: Photon Control Inc., Richmond (CA)

(72) Inventor: Yuriy Syvenkyy, Richmond (CA)

(73) Assignee: Photon Control Inc., Richmond, CA (US)

( * ) Notice: Subject to any disclaimer, the term of this patent is extended or adjusted under 35 U.S.C. 154(b) by 0 days.

(21) Appl. No.: 16/522,769

(22) Filed: Jul. 26, 2019

(65) Prior Publication Data

US 2021/0025819 A1  Jan. 28, 2021

(51) Int. Cl.
*G01N 21/47* (2006.01)
*G01N 21/55* (2014.01)
*G01N 21/95* (2006.01)

(52) U.S. Cl.
CPC ............ *G01N 21/47* (2013.01); *G01N 21/55* (2013.01); *G01N 21/9503* (2013.01)

(58) Field of Classification Search
CPC .... G01N 21/47; G01N 21/55; G01N 21/9503; G01N 21/9501
USPC ............................. 356/614–624, 237.2–237.6
See application file for complete search history.

(56) References Cited

U.S. PATENT DOCUMENTS

| | | | | |
|---|---|---|---|---|
| 6,737,665 B1 * | 5/2004 | Kinrot | ...................... | B65H 7/14 250/559.36 |
| 7,684,053 B2 * | 3/2010 | Chow | ..................... | G01B 11/24 356/602 |
| 7,773,212 B1 * | 8/2010 | Wolters | .............. | G01N 21/9501 356/237.4 |
| 2005/0280807 A1 * | 12/2005 | Backhauss | .............. | G06T 7/001 356/237.2 |
| 2008/0137071 A1 * | 6/2008 | Chow | ................... | G01B 11/026 356/73 |
| 2015/0370175 A1 * | 12/2015 | Nicolaides | .............. | H01L 22/12 355/77 |
| 2015/0371910 A1 * | 12/2015 | Goodwin | ............... | G01N 21/95 438/7 |

* cited by examiner

*Primary Examiner* — Isiaka O Akanbi
(74) *Attorney, Agent, or Firm* — CPST Intellectual Property Inc.; Brett J. Slaney

(57) ABSTRACT

A precision edge detection system and sensor assembly is provided that uses a reflection technique to provide an energy efficient device that can be achieved using a relatively small form factor. There is provided an optical reflective sensor assembly that includes a light source, an optical element positioned to collimate and focus light from the light source to generate a focused beam, and at least one photodetector positioned adjacent the light source. The at least one photodetector is configured to detect light from the focused beam that has been reflected by an object positioned opposite the light source.

23 Claims, 14 Drawing Sheets

OPTICAL REFLECTIVE EDGE OR CONTRAST SENSOR

TECHNICAL FIELD

The following relates to devices used to detect the edge of an object or a transition between surfaces of one or more objects, particularly to optical reflective sensor devices and systems, and methods for operating same.

BACKGROUND

Sensors for detecting the edge of an object are used in a variety of applications. For example, the position of an electrostatic chuck in a semiconductor processing system may need to be determined to instruct the processing system as to where the chuck is located in a chamber for positioning a robotic arm. More generally, edge detection sensors can be used to either find the edge of a static object using a moving detection probe, or detect the edge of an object that moves relative to the detection probe. Similarly, the detection probe can move over the object to find the edge or move towards the object to find the edge. In any of these variety of environments and scenarios, there may be ambient light, various objects and surfaces to track or account for, and space constraints that make edge detection difficult.

A common type of existing edge detection sensor is a through-beam sensor. In a through-beam sensor, light travels between a transceiver and a receiver, and when the light beam is blocked the sensor outputs a signal which can be correlated to an edge detection. Another common type of existing edge detection sensor is one that is based on digital images or video technology. In an image- or video-based edge detector, edge detection is performed using software techniques. Such existing sensors have been found to be sensitive to ambient light conditions, can be slow to respond, and can be expensive to purchase or manufacture.

There are applications, such as in semiconductor manufacturing processes that would benefit from a relatively small sensor that is energy efficient and responsive. It is therefore an object of the following to provide precision edge detection and sensing capabilities that addresses at least one of these considerations.

SUMMARY

The following provides a precision optical detection system and sensor assembly that uses a reflection technique to provide an energy efficient device that can be achieved using a relatively small form factor.

In one aspect, there is provided an optical reflective sensor assembly, comprising: a light source; an optical element positioned to collimate and focus light from the light source to generate a focused beam; and at least one photodetector positioned adjacent the light source, the at least one photodetector configured to detect light from the focused beam that has been reflected by an object positioned opposite the light source.

In another aspect, there is provided an optical reflective detection system, comprising: a substrate; at least one optical reflective sensor assembly supported at least in part by the substrate, each sensor assembly comprising: a light source; an optical element positioned to collimate and focus light from the light source to generate a focused beam; and at least one photodetector positioned adjacent the light source, the at least one photodetector configured to detect light from the focused beam that has been reflected by an object positioned opposite the light source; and a controller coupled to the at least one sensor assembly, the controller comprising a processor and memory, the memory storing computer executable instructions for operating the detection system to generate the focused beam and to detect reflected light.

In yet another aspect, there is provided a method for detecting a signature of reflected light, the signature being indicative of a surface or edge of an object, the method comprising: directing light from a light source through an optical element positioned to collimate and focus light from the light source to generate a focused beam; and detecting light from the focused beam that has been reflected by an object positioned opposite the light source, by at least one photodetector positioned adjacent the light source.

In an implementation, the light source can be positioned within an opening in the photodetector, wherein the optical element is positioned at an edge of the opening.

In an implementation, the assembly can further include a light insulating cap surrounding the light source, the light insulating cap supporting the optical element above the light source, and the light insulating cap being positioned adjacent the at least one photodetector.

In an implementation, the light source and the photodetector are coupled to a substrate. In an implementation, the light source and the photodetector are coupled to a controller of an optical detection system.

In an implementation, the at least one photodetector can be configured to detect rays of reflected light indicative of the presence of an edge of the object. The at least one photodetector can also be configured to detect rays of reflected light indicative of at least one surface of the object or multiple objects. The at least one photodetector can also be configured to detect a plurality of types of rays of reflected light, each corresponding to a signature. The assembly can also include a memory storing signatures for at least one type of ray of reflected light.

In an implementation, the sensor assembly can also include a light filter coupled to the photodetector. The sensor assembly can also include at least one lens positioned between the object and the photodetector to interact with the reflected light.

BRIEF DESCRIPTION OF THE DRAWINGS

Embodiments will now be described with reference to the appended drawings wherein.

DETAILED DESCRIPTION

The following provides precision edge and contrast detection using an optical system that uses light reflectance. The system described herein can be used in any application or environment in which a spatial characteristic of an object is to be measured and is indicative of the presence or absence of an edge, and/or the presence or absence of contrasting surfaces, materials, objects, components, elevations, etc.

Figure 1A:
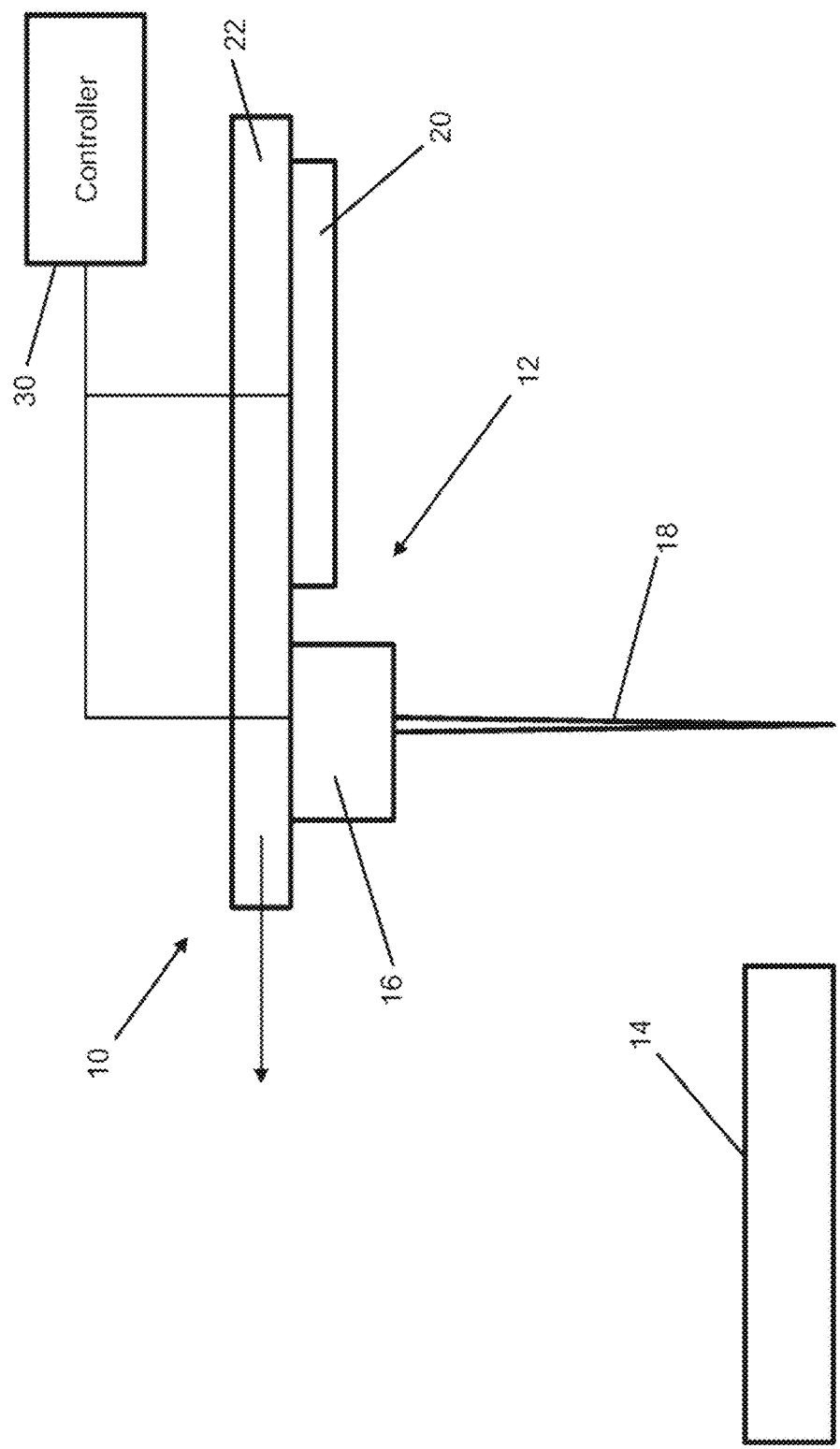
FIG. 1A is a schematic diagram of an optical reflective edge detection system having a moving detection probe.

Turning now to the figures, FIG. 1A illustrates a configuration for an optical reflective edge detection system 10, also referred to herein as the "system" 10. It can be appreciated that while the system 10 is exemplified herein as an "edge" detection system 10, the system 10 may also be adapted and used to detect contrasts in materials and surfaces, i.e., where contrasts or "signatures" in the reflected light can be detected and identified. The term "edge" as used here may therefore refer to a physical edge of an object or the edge or boundary of a transition between contiguous materials or surfaces.

The system 10 includes one or more sensor assemblies 12 used to detect an edge or transition of, or associated with, an object 14. In the example shown in FIG. 1A, a single sensor assembly 12 is shown, however, it will be appreciated that multiple sensor assemblies 12 may (and preferably would) be used to provide additional accuracy in the system 10. The system 10 and the object 14 may be located within a chamber with a minimum of ambient light or may be located in another environment with more potential ambient light. The object 14 may be fixed to another object or supported on a surface of another object such as the above-noted chamber (not shown). In this example, the system 10 moves relative to the object 14 to find the edge of the object 14. For example, the system 10 may be controlled to move towards the object 14 to determine an offset of the object 14 relative to a datum used to apply a processing step to the object 14, locate and pick up the object 14, etc.

The sensor assembly 12 includes a light source assembly 16 that emits a narrow light beam 18, and a photodetector 20 for detecting reflected or scattered rays. The sensor assembly 12 (and any other sensor assembly 12 not shown) can be supported by and attached to a substrate 22 of the system 10. The system 10 also includes a controller 30 that is coupled to the light source assembly 16 and the photodetector 20 of each sensor assembly 12 to cause the light source assembly 16 to generate the narrow beam of light 18 and to detect edges or transitions/contrasts based on what is detected at the photodetector 20.

Figure 1B:
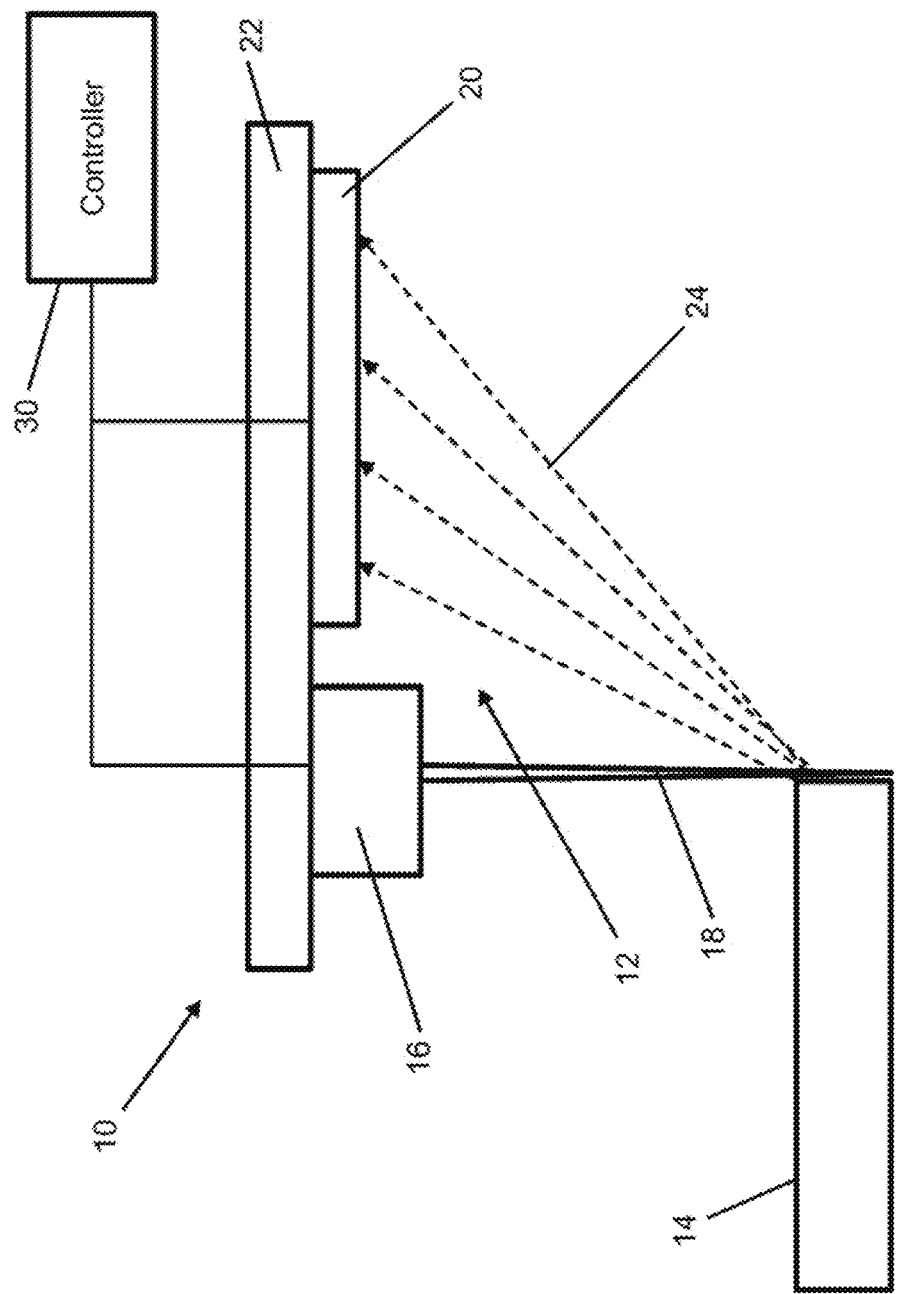
FIG. 1B illustrates the edge detection system of FIG. 1A in a second position in which an edge of an object is detected.

FIG. 1B illustrates the system 10 in a second position in which the narrow beam of light 18 has encountered the edge of the rightmost edge of the object 14 and creates a number of reflected/scattered rays 24 that are detected by the photodetector 20. The system 10 can be calibrated to recognize a signature associated with the rays 24, e.g., to distinguish from ambient light and/or any reflected or scattered rays caused by the beam of light 18 hitting an underlying surface or other object within the same environment (not shown). By having a relatively narrow beam 18 of light, a high precision of accuracy can be possible for the sensor assembly 12. Further details of the light source assembly 16 that generates such a relatively narrow beam 18 of light is provided below.

Figure 2A:
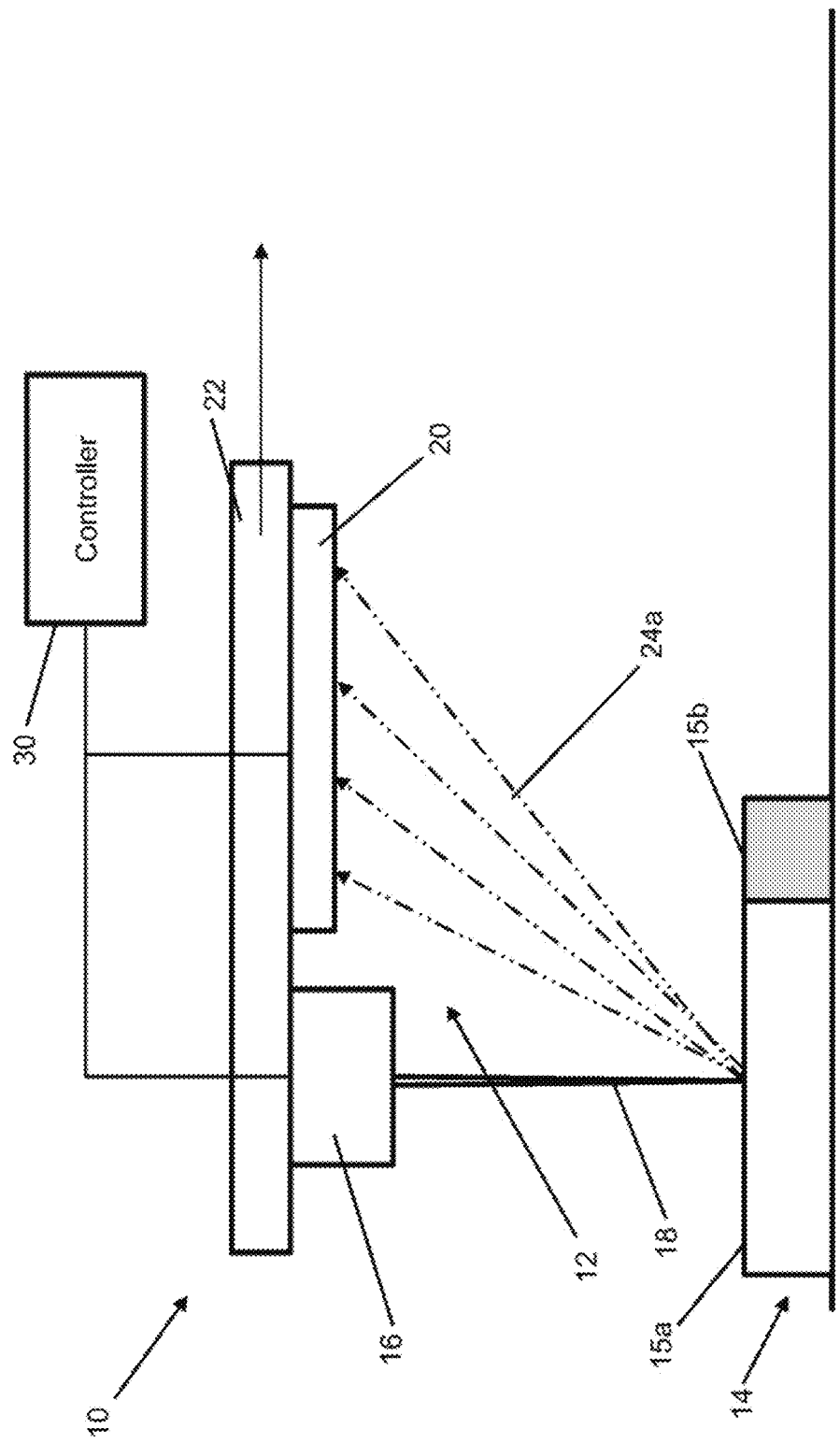
FIG. 2A is a schematic diagram of an optical reflective edge detection system having a moving detection probe configured to move over an object having multiple surface types.

FIG. 2A illustrates a similar configuration for the system 10 as that shown in FIGS. 1A-1B, with a left-to-right movement of the substrate 22 over the object 14 for illustrative purposes. In this example, the object 14 includes a first surface 15a and a contiguous second surface 15b provided by a pair of materials or components of the object 14. In FIG. 2A, the beam of light 18 when interacting with the first surface 15a generates a first type of reflected or scattered ray 24a that can be detected and identified by the photodetector 20 and controller 30. This first type of ray 24a is correlated to the first surface 15a in order to detect when the beam 18 crosses the transition between the first surface 15a and the second surface 15b. This example can be applicable to scenarios wherein the object of interest is a portion of the object 14 that provides the first surface 15a and therefore detecting the physical edge of the object 14 may not provide enough information for the desired objective. It can be appreciated that these principles also apply to objects or surfaces that are at different elevations or otherwise positioned at different distances from the sensor assembly 16, whether they are differing materials or not.

Figure 2B:
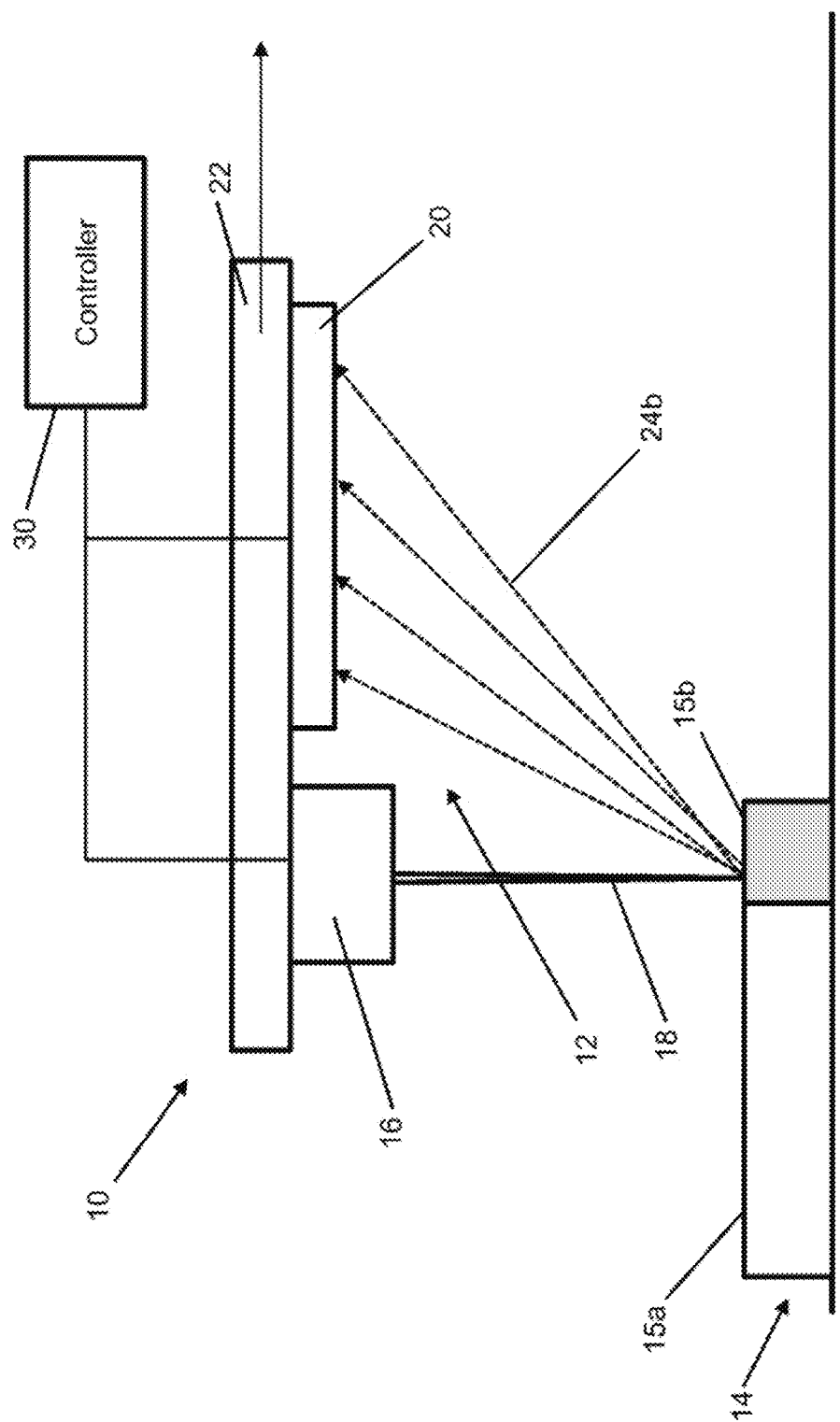
FIG. 2B illustrates the edge detection system of FIG. 2A detecting a contrast between two surfaces of the object.

Referring now to FIG. 2B, the system 10 has moved over the object 14 to a position wherein the beam 18 detects the second surface 15b. In the example shown in FIG. 2B, a second type of reflected or scattered ray 24b (denoted using a different type of dashed line in FIG. 2B) is detected by the photodetector 20 and controller 30 to indicate positionally where is the second surface 15b associated with the object 14.

Figure 2C:
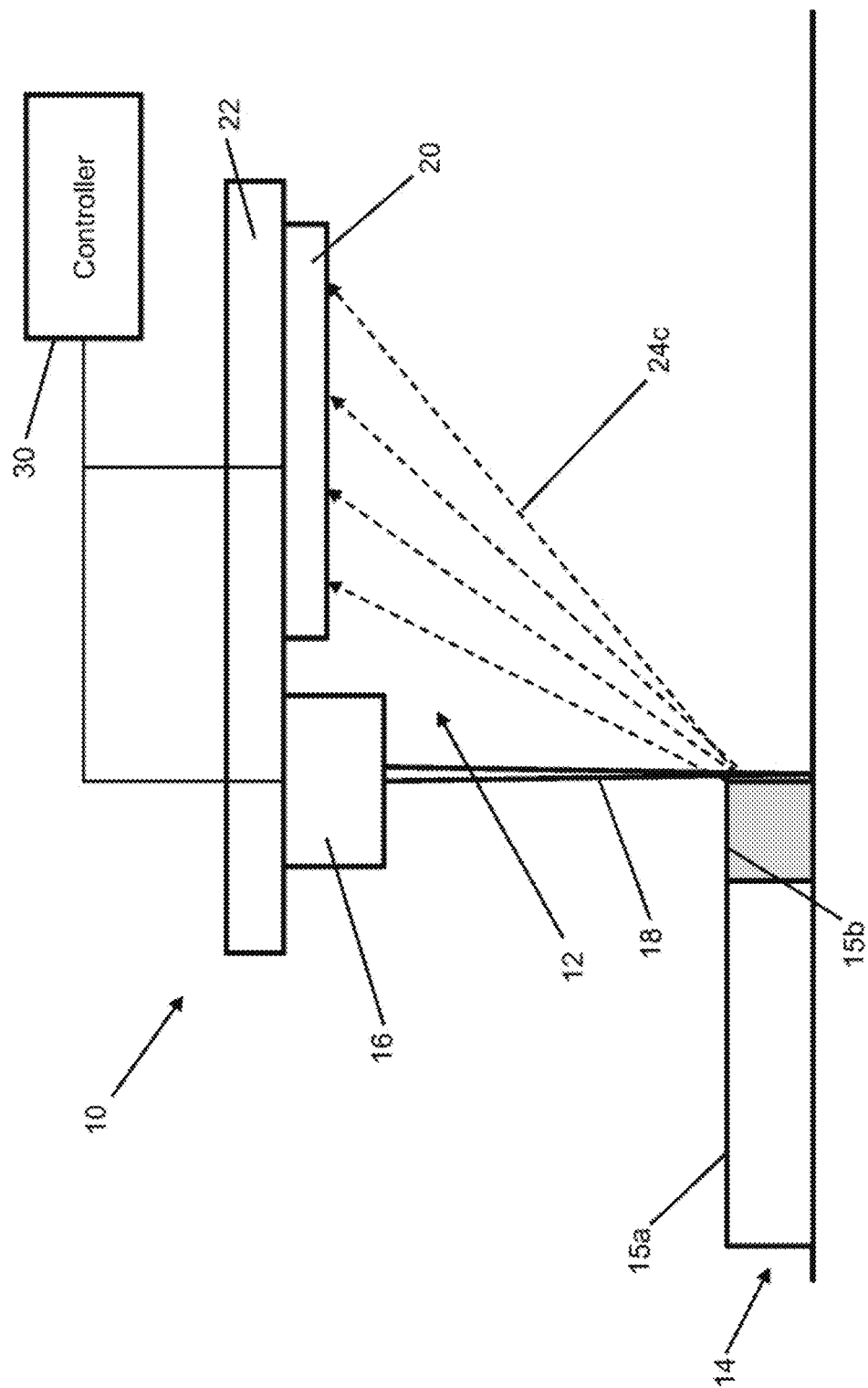
FIG. 2C illustrates the edge detection system of FIGS. 2A and 2B upon detecting an edge of the object.

Further movement of the system 10 is illustrated in FIG. 2C wherein the beam 18 encounters the edge of the object 14 causing a third type of reflected or scattered ray 24c that is denoted using the same dashed lines as those shown in FIG. 1B for illustrative purposes. The system 10 can detect both edges and contrasts associated with the object 14. The system 10 can be calibrated to distinguish between the different types of rays 24 that are scattered or reflected by different surfaces and objects within the testing or detection environment in which the system 10 is being used by storing predetermined signatures. These signatures can be stored by the controller 30 for use in an application, e.g., during a calibration process as discussed in greater detail below.

Figure 3A:
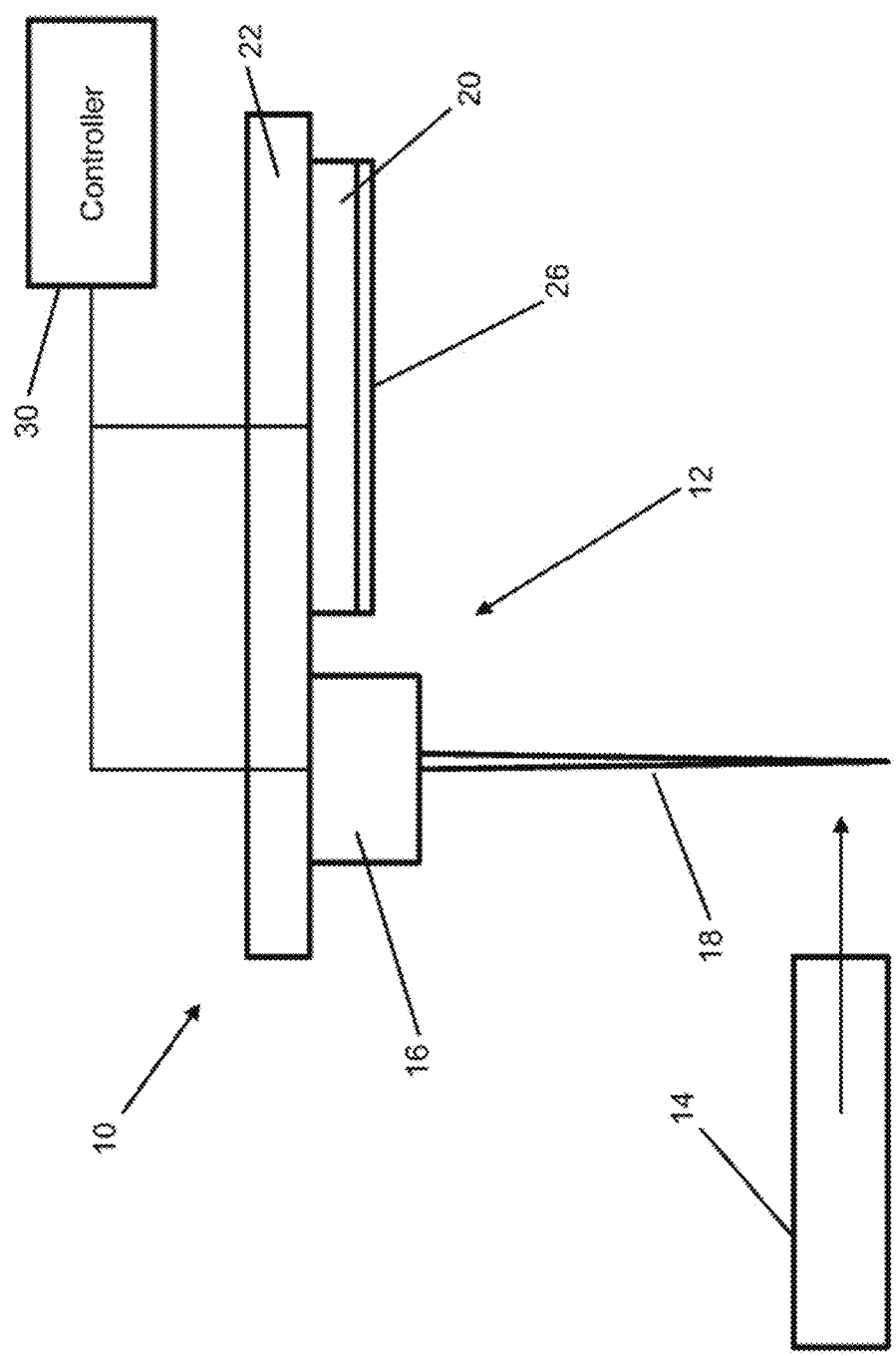
FIG. 3A is a schematic diagram of an optical reflective edge detection system having a static detection probe for detecting an object moving relative thereto.
Figure 3B:
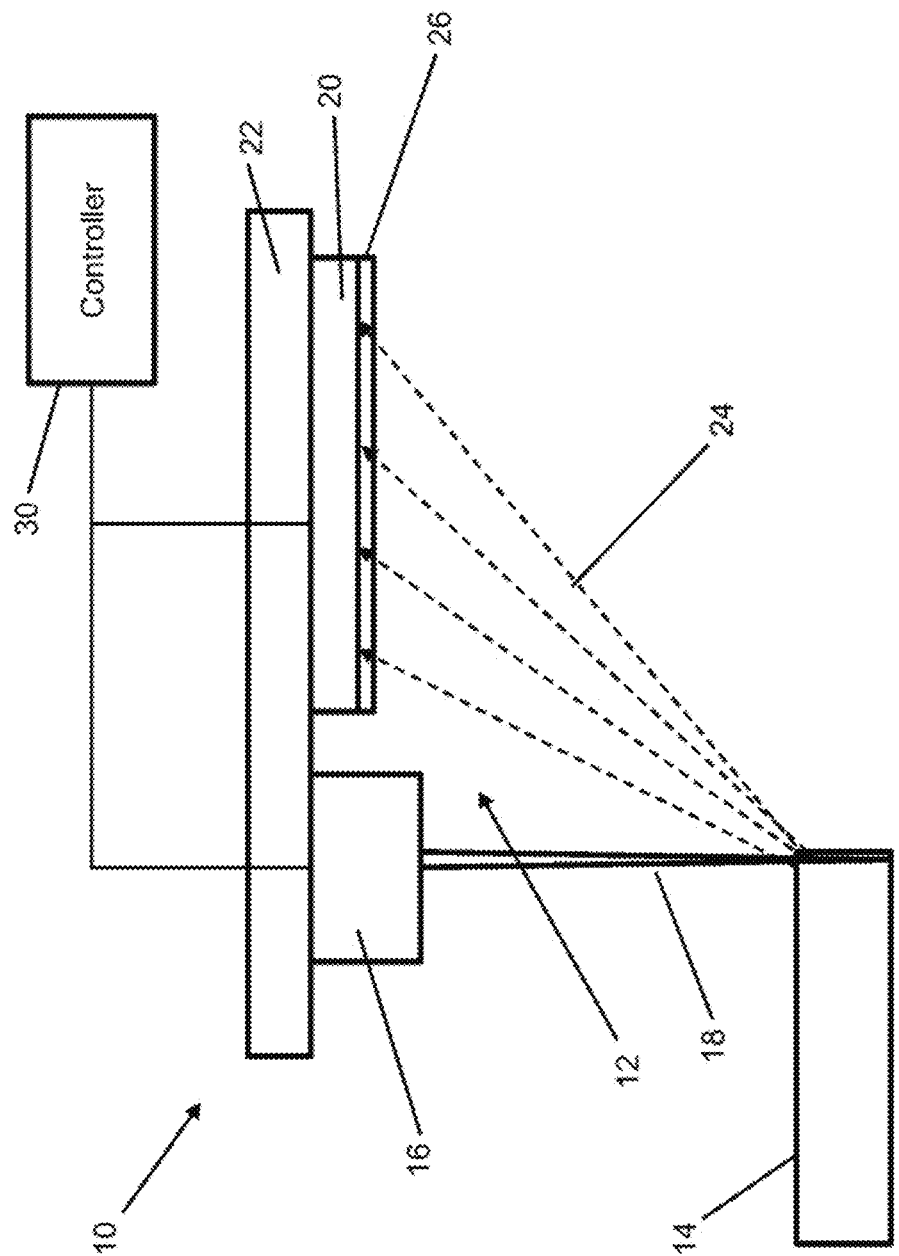
FIG. 3B illustrates the edge detection system of FIG. 3A with the object in a second position in which an edge of the object is detected.

FIG. 3A illustrates another configuration for the system 10 in which the substrate 22 and thus the sensor assembly 16 are positionally static and detect the edge of a moving object 14. For example, the configuration shown in FIG. 3A may be used to control the movement of the object 14 into a chamber or station within a manufacturing process to align with another object or device (not shown). Also shown in FIG. 3A by way of example is a light filter 26 positioned relative to the photodetector 20 to filter out ambient light. Otherwise, as illustrated in FIG. 3B, the system 10 may operate similar to what is shown in FIGS. 1 and 2 by generating a relatively narrow beam of light 18 that generates reflected/scattered rays 24 when the beam 18 encounters an edge of the object 14. As illustrated in FIG. 3B, the filter 26 can be configured to permit passage of the rays 24 while filtering other light that could otherwise degrade the precision of the detection capabilities of the system 10.

Figure 4:
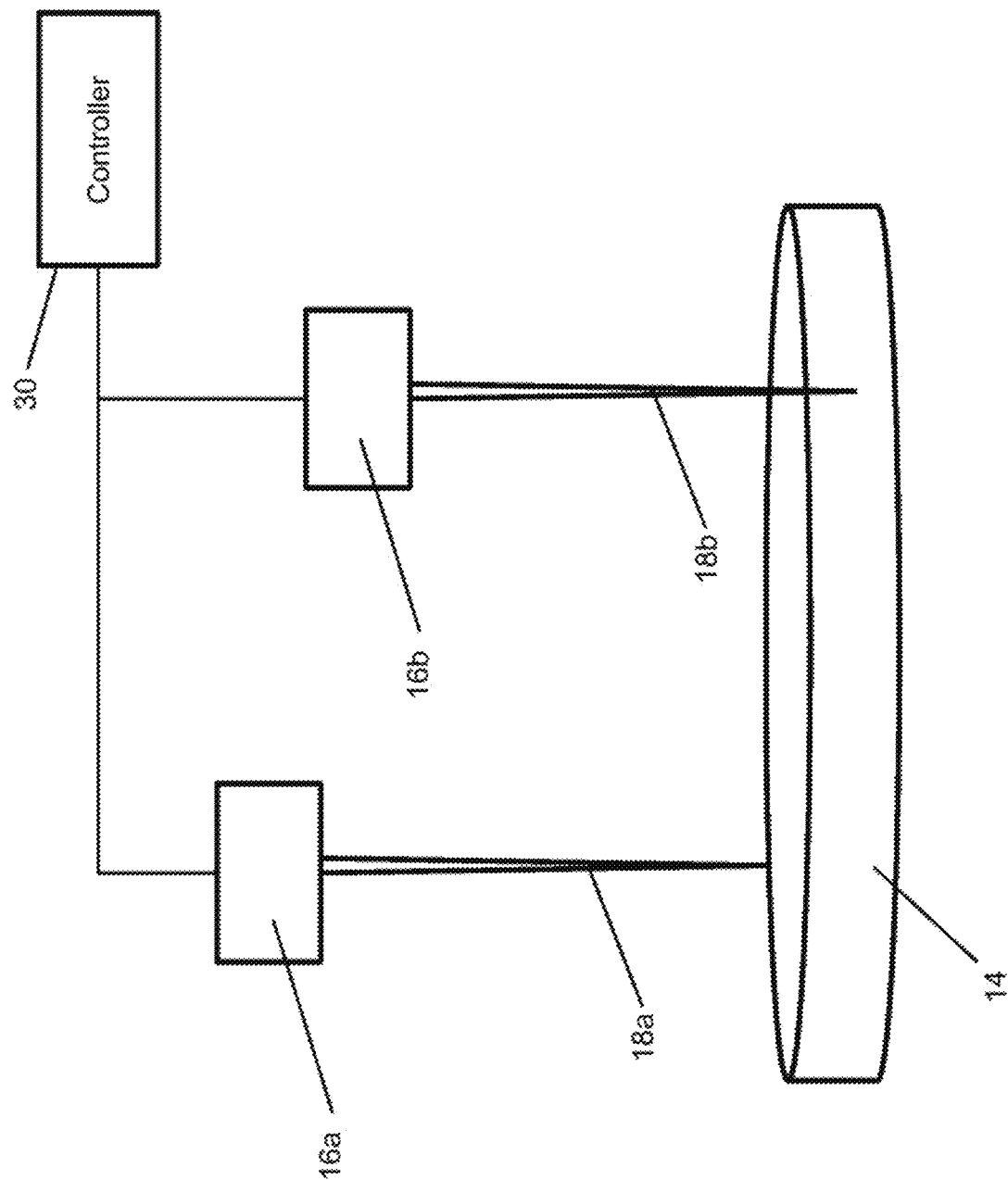
FIG. 4 is a partial schematic diagram of an optical reflective edge detection system having multiple edge sensors.

As discussed above, the system 10 can, and often will, include multiple sensor assemblies 12 to increase the accuracy and precision of the system 10. FIG. 4 illustrates schematically a first light source assembly 16a generating a first narrow beam 18a and a second light source assembly 16b generating a second narrow beam 18b. The beams 18a, 18b can be used to detect multiple edges at the same time as illustrated in FIG. 4, e.g., to enable a two-dimensional positioning within the environment, or can be used to detect different objects 14 (not shown). The controller 30 can be configured to control both light source assemblies 16a, 16b.

Figure 5:
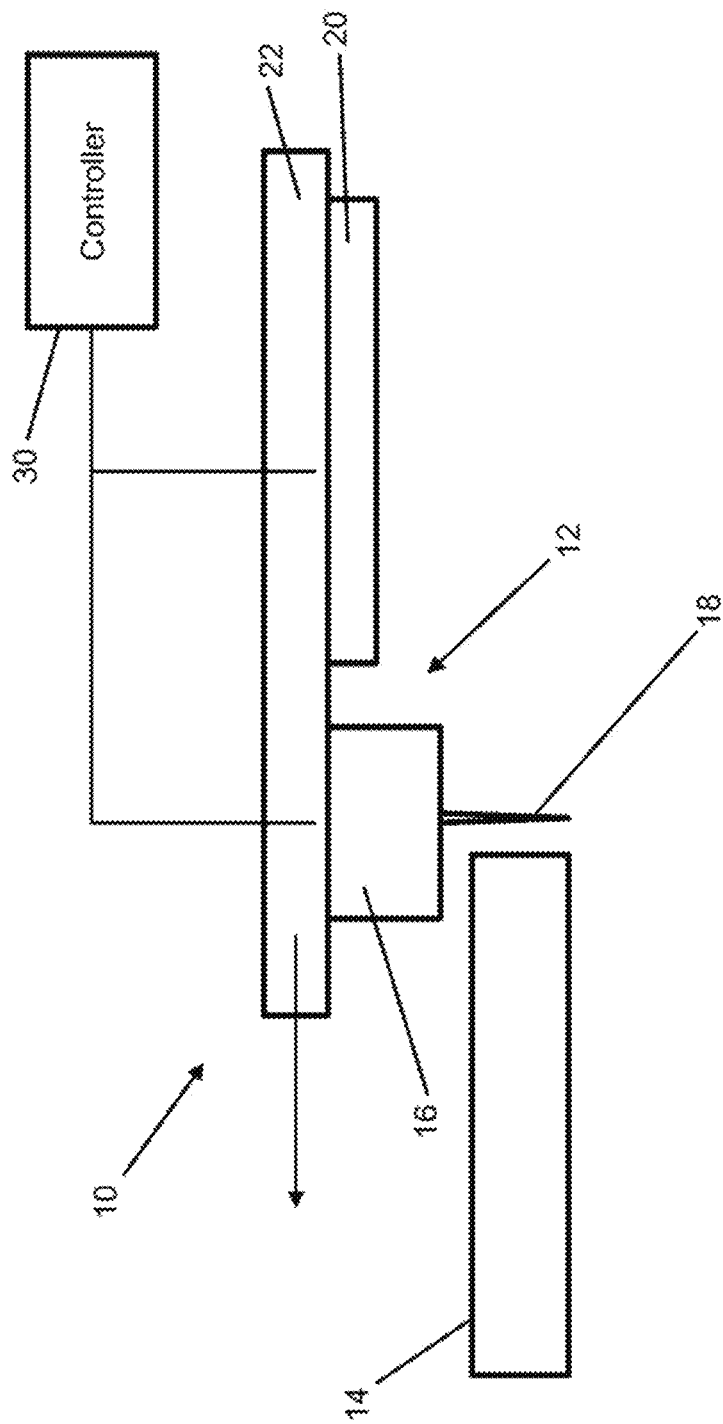
FIG. 5 is a schematic diagram of an optical reflective edge detection system in a compact configuration.

Turning now to FIG. 5, the configuration for the system 10 shown therein illustrates the potential compact arrangement that can be achieved by using a reflective-type sensor assembly 12. In this example, so long as reflected or scattered rays can reach the photodetector 20 when the beam 18 reflects off a surface or hits an edge, the system 10 can be positioned relatively close to the object 14. It can be appreciated that the relative sizes and proportions for the components shown in FIG. 5 are illustrative only and can be adapted to ensure that at least some of the reflected/scattered rays 24 reach the photodetector.

Figure 6:
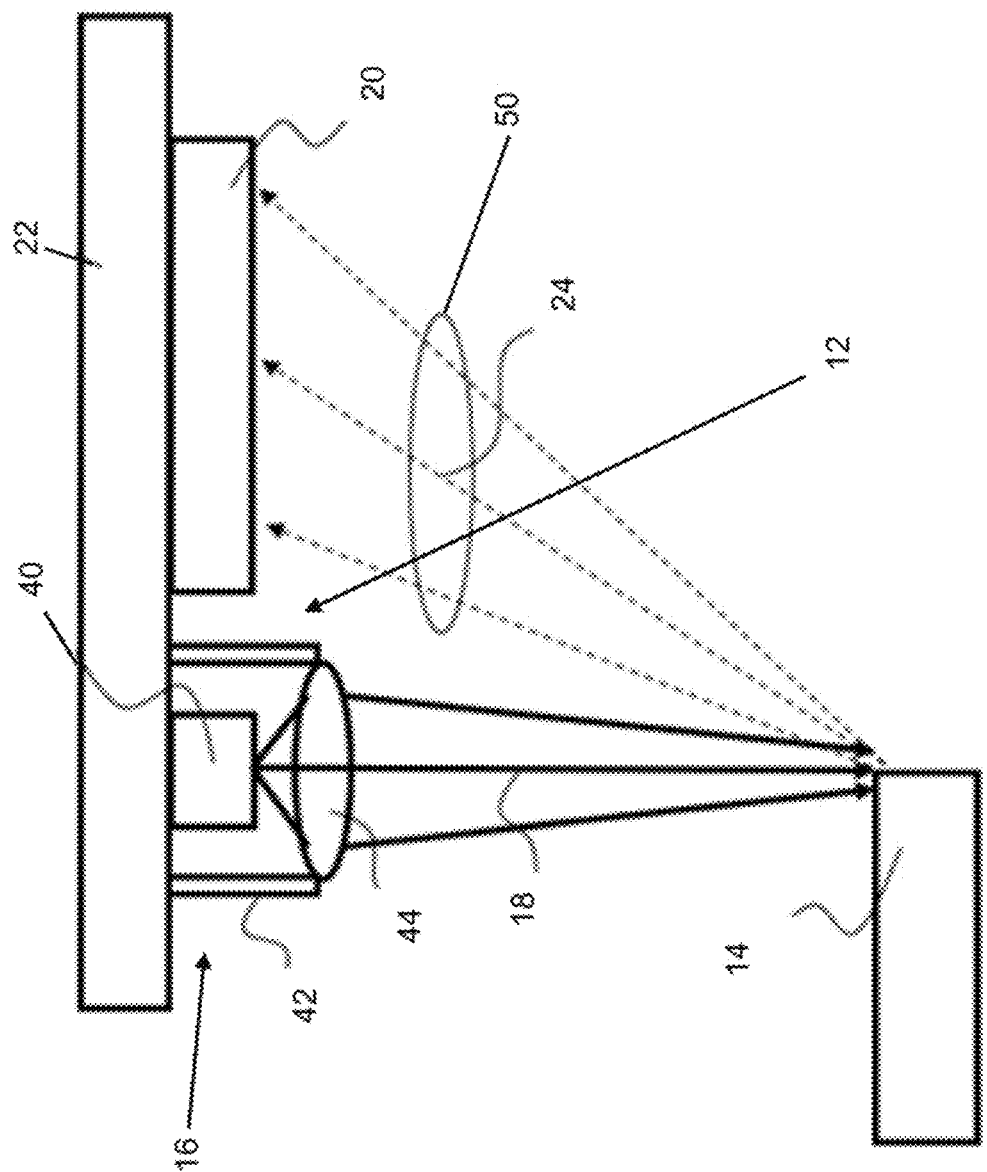
FIG. 6 is a schematic diagram of a configuration for a sensor assembly used with the optical reflective edge detection system.

Detail concerning one example configuration for the sensor assembly 12 is shown in FIG. 6. In this example configuration, the light source assembly 16 includes a light source 40 positioned within a light insulating cap 42 or other walled structure having an open end to permit light generated by the light source 40 to pass therethrough. The light source 40 can be, for example, a light emitting diode (LED), a vertical-cavity surface-emitting laser (VCSEL), a super-luminescent diode (SLED), or other similar type of light-emitting device. The light insulating cap 42 supports a lens 44 or other optical element that collimates the light emitted by the light source 40 to generate the relatively narrow beam 18. It can be appreciated that the size and position of the light insulating cap 42 can be chosen to provide a suitable distance between the lens 44 and the light source 40 and to center the lens 44 relative to the light source. The lens 44 can be, for example, a micro aspheric, rod gradient or convex type lens to provide light collimation and focusing as illustrated herein. Optionally, the sensor assembly 12 can further include a lens 50 positioned between the object 14 and the photodetector 20 to disperse the rays 24 to improve the detection of the rays 24 by the photodetector 20. This can increase the detection efficiency and insulate the sensor assembly 12 from the ambient light.

Figure 7:
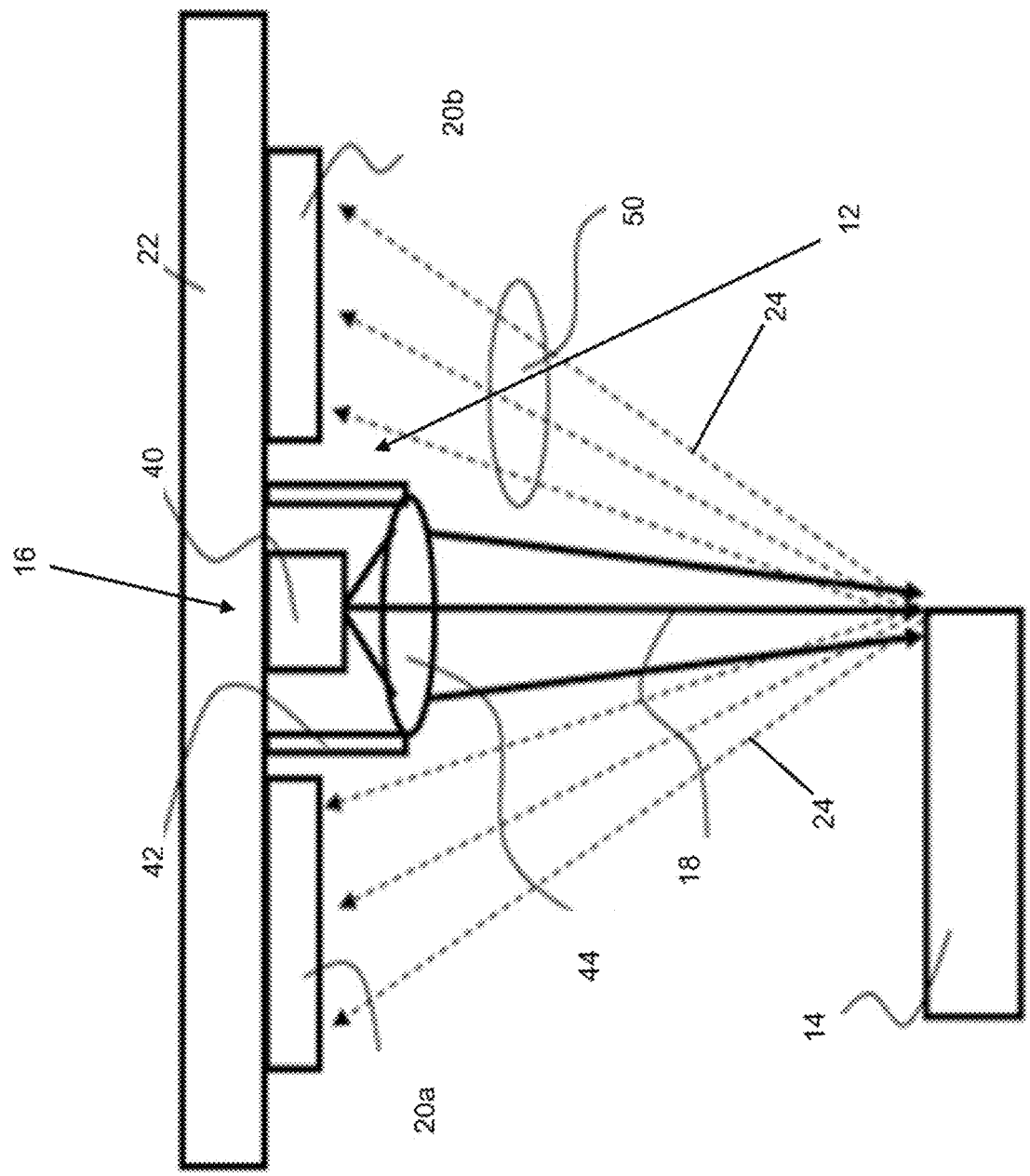
FIG. 7 is a schematic diagram of another configuration for a sensor assembly used with the optical reflective edge detection system.
Figure 9:
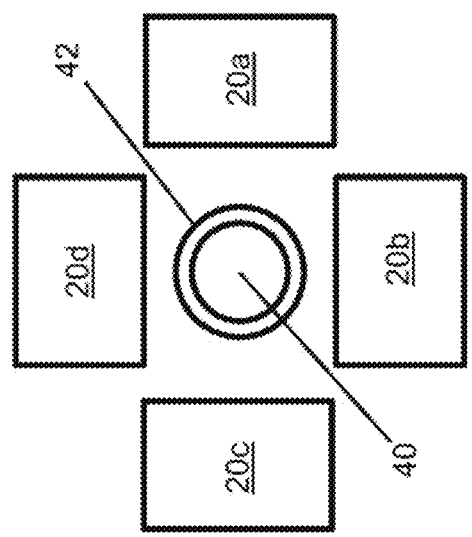
FIG. 9 is a schematic plan view of an arrangement of photo detectors for a sensor assembly according to the configuration shown in FIG. 7.

FIG. 7 illustrates a configuration that is similar to that shown in FIG. 6, with multiple photodetectors 20a, 20b positioned about the light source assembly 16. While only a single lens 50 is shown for interacting with the reflected rays 24, it can be appreciated that a second lens (not shown) could also be positioned relative to the photodetector 20a shown to the left of the light source assembly 16 in the diagram. It can be appreciated that the elevation view in FIG. 7 shows a pair of photodetectors 20, however, additional photodetectors 20 can be placed about the light insulating cap 42 as illustrated in FIG. 9. In the example shown in FIG. 9, first, second, third, and fourth photodetectors 20a, 20b, 20c, and 20d are positioned about the light insulating cap 42 and light source 40, however more or fewer discrete elements can be used.

Figure 8:
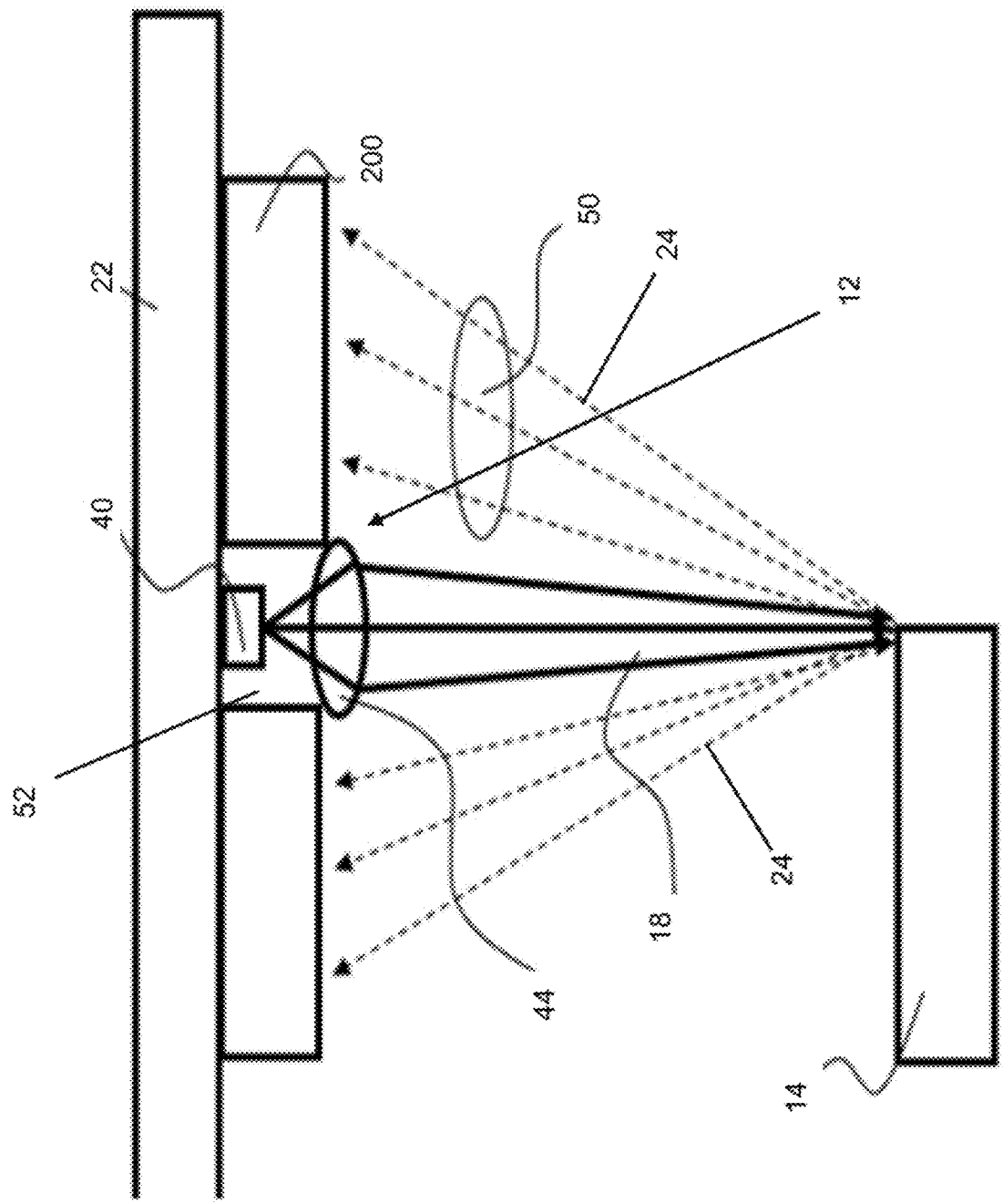
FIG. 8 is a schematic diagram of yet another configuration for a sensor assembly used with the optical reflective edge detection system.
Figure 10:
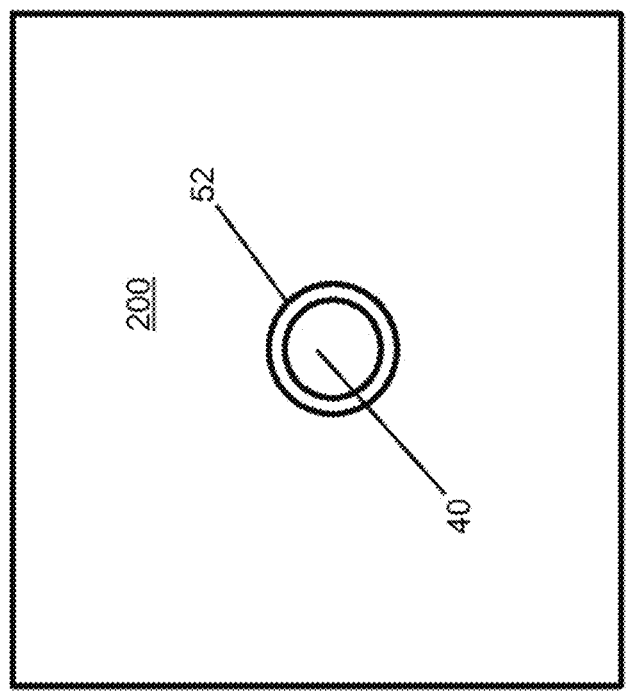
FIG. 10 is a schematic plan view of a photo detector for a sensor assembly according to the configuration shown in FIG. 8.

FIG. 8 illustrates yet another configuration for the sensor assembly 12 in which a photodetector 200 includes a hole, depression, aperture, or cavity, referred to herein as an opening 52 to reflect that the cavity or depression can be either complete (as in a hole or aperture) or partial (as in a depression, cavity, notch, slot, etc.). As can be appreciated from FIG. 8 and FIG. 10, in this configuration the substrate 22 supports a single photodetector 200 with the opening 52 formed therein (e.g., by drilling a hole through the photodetector 200). The opening 52 provides a region or area into which the light source 40 can be placed. The lens 44 can also be positioned at the upper edge of the opening 52 as illustrated in FIG. 8 with the side walls of the opening 52 providing a functional equivalent to the light insulating cap 42 to prevent the photodetector 200 from detecting the beam 18 prior to being reflected by the object 14. As with FIG. 7, it can be appreciated that while only a single lens 50 is shown for interacting with the reflected rays 24, a second lens (not shown) could also be positioned relative to the photodetector 20a shown to the left of the light source assembly 16 in the diagram.

It can also be appreciated that any of the configurations shown in FIGS. 6-8 can be used in any of the scenarios shown in FIGS. 1-5, e.g., with a moving or static system 10, a moving or static object 14, multiple sensor assemblies 12, with various distances between the system 10 and the object 14, etc.

Figure 11:
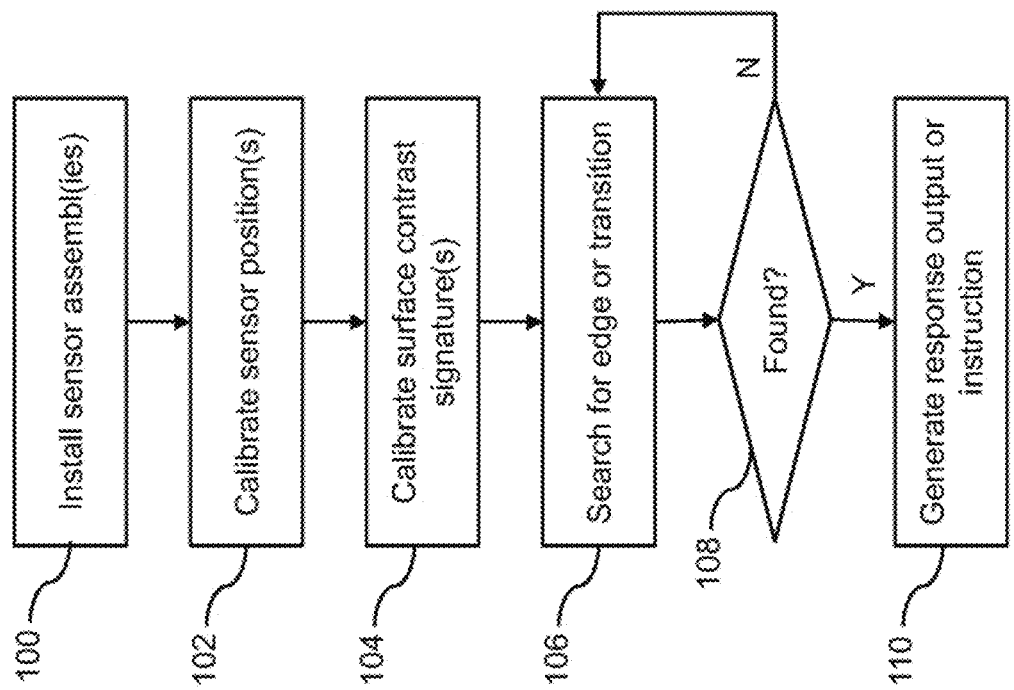
FIG. 11 is a flow chart illustrating computer executable instructions that may be executed in operating an optical reflective edge detection system.

Referring now to FIG. 11, a flow chart illustrating computer executable instructions that can be implemented to enable the controller 30 to operate the system are shown. In step 100 the one or more sensor assemblies 12 are installed or otherwise provided within the environment, application, or apparatus in which they are to be used. For example, the system 10 may be part of a larger device onto which a desired number of sensor assemblies 12 are installed. At step 102 the system 10 is calibrated to determine the positions of the sensor assemblies 12, e.g., to establish a baseline or datum for any particular edge or contrast detection spatially within the environment. At step 104, the system 10 can be calibrated to determine a signature for each surface or edge to be detected. For example, in the configuration and scenario shown in FIG. 2, three different reflection/scatter signatures may be determined, each indicative of the presence of a particular surface, edge, object, component of an object, etc.

It can be appreciated that steps 100-104 may be associated with a set-up or calibration process and may only be required once or periodically for a given system 10. At step 106, the controller 30 operates the light source 40 and photodetector(s) 20 to search for an edge or transition/contrast over a surface of an object 14. This step may also include operation of a servo-motor or signaling of an instruction to have the substrate 22 or the object 14 moved relative to each other to enable the detection operation. At step 108 the controller 30 determines whether the edge or transition or contrast has been found. If not, the controller 30 may continue to await a detection event by repeating step 106. If an edge or transition or contrast is found or detected at 108, the controller 30 can generate a response output or instruction at step 100. The response output or instruction can be internal to the system 10 (i.e. to have the system 10 react in a predetermined manner according to the detection)

or external to the system 10, e.g. to provide an output, response, instruction, alert, etc. to another system.

For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the system 10, the controller 30, the assemblies 12, 16, any component of or related to thereto, etc., or accessible or connectable thereto. Any application or module herein described may be implemented using computer readable/executable instructions that may be stored or otherwise held by such computer readable media.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

The invention claimed is:

1. An optical reflective sensor assembly, comprising:
   a light source;
   an optical element positioned to collimate and focus light from the light source to generate a focused beam; and
   a single photodetector surrounding the light source, the light source being positioned within an opening in the photodetector, the photodetector configured to detect light from the focused beam that has been reflected by an object positioned opposite the light source;
   wherein the optical element is positioned at an edge of the opening.

2. The sensor assembly of claim 1, further comprising a light insulating cap surrounding the light source, the light insulating cap supporting the optical element above the light source, the light insulating cap being surrounded by the photodetector.

3. The sensor assembly of claim 1, wherein the light source and the photodetector are coupled to a substrate.

4. The sensor assembly of claim 1, wherein the light source and the photodetector are coupled to a controller of an optical detection system.

5. The sensor assembly of claim 1, wherein the photodetector is configured to detect rays of reflected light indicative of the presence of an edge of the object.

6. The sensor assembly of claim 1, wherein the at photodetector is configured to detect rays of reflected light indicative of at least one surface of the object or multiple objects.

7. The sensor assembly of claim 6, wherein the photodetector is configured to detect a plurality of types of rays of reflected light, each corresponding to a signature.

8. The sensor assembly of claim 7, further comprising a memory storing signatures for at least one type of ray of reflected light.

9. The sensor assembly of claim 1, further comprising a light filter coupled to the photodetector.

10. The sensor assembly of claim 1, further comprising at least one lens positioned between the object and the photodetector to interact with the reflected light.

11. An optical reflective detection system, comprising:
    a substrate;
    at least one optical reflective sensor assembly supported at least in part by the substrate, each sensor assembly comprising:
       a light source;
       an optical element positioned to collimate and focus light from the light source to generate a focused beam; and
       a single photodetector surrounding the light source, the light source being positioned within an opening in the photodetector, the photodetector configured to detect light from the focused beam that has been reflected by an object positioned opposite the light source, wherein the optical element is positioned at an edge of the opening; and
    a controller coupled to the at least one sensor assembly, the controller comprising a processor and memory, the memory storing computer executable instructions for operating the detection system to generate the focused beam and to detect reflected light.

12. The system of claim 11, comprising a plurality of sensor assemblies supported by the substrate, each sensor assembly being coupled to the controller.

13. The system of claim 11, wherein each sensor assembly further comprises a light insulating cap surrounding the light source, the light insulating cap supporting the optical element above the light source, the light insulating cap being surrounded by the photodetector.

14. The system of claim 11, wherein the photodetector is configured to detect rays of reflected light indicative of the presence of an edge of the object.

15. The system of claim 11, wherein the photodetector is configured to detect rays of reflected light indicative of at least one surface of the object or multiple objects.

16. The system of claim 15, wherein the photodetector is configured to detect a plurality of types of rays of reflected light, each corresponding to a signature stored in the memory.

17. The system of claim 11, further comprising a light filter coupled to the photodetector.

18. The system of claim 11, further comprising at least one lens positioned between the object and the photodetector to interact with the reflected light.

19. A method for detecting a signature of reflected light, the signature being indicative of a surface or edge of an object, the method comprising:
 directing light from a light source through an optical element positioned to collimate and focus light from the light source to generate a focused beam; and
 detecting light from the focused beam that has been reflected by an object positioned opposite the light source, by a single photodetector surrounding the light source, the light source being positioned within an opening in the photodetector, wherein the optical element is positioned at an edge of the opening.

20. The method of claim 19, further comprising comparing detected rays of reflected light to at least one signature to detect an edge or surface of the object.

21. The method of claim 19, further comprising generating an output indicative of detected rays of reflected light indicative of an edge or surface of the object.

22. The method of claim 19, further comprising calibrating a position associated with the focused beam prior to the directing step.

23. The method of claim 19, further comprising calibrating at least one surface contrast or edge signature according to detected rays of reflected light, prior to the directing step.

\* \* \* \* \*